US009752548B2

United States Patent
Patti et al.

(10) Patent No.: US 9,752,548 B2
(45) Date of Patent: Sep. 5, 2017

(54) METHOD AND PROCESSING SYSTEM OF SENSED IONIZATION CURRENT DATA FOR REAL TIME ESTIMATION OF COMBUSTION CHAMBER PRESSURE IN A SPARK IGNITION ENGINE

(71) Applicant: STMicroelectronics S.r.l., Agrate Brianza (MB) (IT)

(72) Inventors: DavideGiuseppe Patti, Mascalucia (IT); Mario Paparo, San Giovanni La Punta (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 598 days.

(21) Appl. No.: 14/272,980

(22) Filed: May 8, 2014

(65) Prior Publication Data

US 2014/0336956 A1    Nov. 13, 2014

(30) Foreign Application Priority Data

May 9, 2013   (IT) ............... MI2013A0750

(51) Int. Cl.
  *G01V 3/38*   (2006.01)
  *F02P 17/12*   (2006.01)
  (Continued)

(52) U.S. Cl.
  CPC ............ *F02P 17/12* (2013.01); *F02D 35/021* (2013.01); *F02D 35/024* (2013.01); *F02D 41/22* (2013.01);
  (Continued)

(58) Field of Classification Search
  CPC .... F02D 35/021; F02D 35/024; F02D 35/027; F02P 17/12; G01L 23/226; G01M 15/042; G01M 15/09
  See application file for complete search history.

(56) References Cited

U.S. PATENT DOCUMENTS 5,492,007 A   2/1996  Noble et al.
6,684,151 B1  1/2004  Ring
(Continued)

FOREIGN PATENT DOCUMENTS

DE   102006016905 A1   10/2007
EP       1712781 A1    10/2006
(Continued)

OTHER PUBLICATIONS

Nielsen et al., An Ion-Sense Engine Fine-Tuner, Oct. 1998, IEEE Publication, pp. 42-52.*
(Continued)

*Primary Examiner* — Elias Desta
(74) *Attorney, Agent, or Firm* — Slater Matsil, LLP

(57) ABSTRACT

The pressure in the combustion chamber of an electronically controlled spark plug ignition engine may be estimated in real time mode without specific sensors by processing sensed ionization current data to calculate features of the current waveform proven to be correlated to the pressure inside the engine cylinders and correlating them on the basis of a look up table of time invariant correlation coefficients generated through a calibration campaign of tests on a test engine purposely equipped with sensors. A mathematical model of the electrical and physical spark plug ignition system and combustion chamber of the engine is refined during calibration by iteratively testing the interactive performance of correlation coefficients of related terms of a mathematical expression of the model and comparing the expressed pressure value with the real pressure value as measured by a sensor.

21 Claims, 13 Drawing Sheets

(51) Int. Cl.
F02D 41/22 (2006.01)
F02D 41/24 (2006.01)
F02D 35/02 (2006.01)
G01M 15/09 (2006.01)
G01M 15/04 (2006.01)

(52) U.S. Cl.
CPC ..... *F02D 41/2422* (2013.01); *F02D 41/2425* (2013.01); *G01M 15/09* (2013.01); *G01M 15/042* (2013.01); *Y02T 10/40* (2013.01)

(56) References Cited

U.S. PATENT DOCUMENTS

| | | | |
|---|---|---|---|
| 7,747,380 B2* | 6/2010 | Chauvin | G01M 15/12 123/406.24 |
| 8,941,385 B2 | 1/2015 | Patti et al. | |
| 2003/0172907 A1* | 9/2003 | Nytomt | F02D 35/023 123/406.14 |
| 2007/0204682 A1 | 9/2007 | Sunwoo et al. | |

FOREIGN PATENT DOCUMENTS

| | | |
|---|---|---|
| JP | H10252632 A | 9/1998 |
| WO | WO 01/88359 A1 | 11/2001 |

OTHER PUBLICATIONS

Andersson, "Cylinder Pressure and Ionization Current Modeling for Spark Ignitied Engines", 2002, Linkopings University, Sweden, pp. 1-93.*

Italian Search Report and Written Opinion dated Feb. 11, 2014 from Italian Application No. MI2013A000750.

Martychenko, A.A., *A Study on the Possibility of Estimation of In-Cylinder Pressure by Means of Measurement of spark Gap Break Voltage*, URL: http://alnemiga.com/Papers/English/Pressure.

A.A. Martychenko, J.K. Park, Y.S.. Ko, A.A.. Balin, J.W. Hwang, J.O. Chae, "A Study on the Possibility of Estimation of In-Cylinder Pressure by Means of Measurement of Spark Gap Breakdown Voltage", SAE, Warrendale, PA, Tech. Rep. 1999-01-1115, 1999, pp. 1-7.

Shizhuo Zheng, Xin Zhang, Zhiyong Shen, "Study on Cycle-by-Cycle Variations of Ion Current Integral and Pressure in Spark Ignition Engine," 2011 International Conference on Electronic & Mechanical Engineering and Information Technology, Aug. 2011, pp. 3404-3407.

Guoming G. Zhu, Ibrahim Haskara, and Jim Winkelman, "Closed-Loop Ignition Timing Control for SI Engines Using Ionization Current Feedback," IEEE Transactions on Control Systems Technology, vol. 15, No. 3, May 2007, pp. 416-427.

N.A. Henein, W.Bryzik, A. Abdel-Rehim and A. Gupta, "Characteristics of Ion Current Signals in Compression Ignition and Spark Ignition Engines" SAE, Warrendale, PA, Tech. Rep. 2010-01-0567, Apr. 2010, pp. 260-264.

Guagyu Dong, Zhijun Wu, Liguang Li, Fafa Liu, Yingnan Guo, "Method of Ion Current Detection for HCCI Combustion on SI/HCCI Dual Mode Engine", 978-1-4244-3504, Mar. 2009 IEEE, pp. 1221-1226.

Zhongquan Gao, Xiaomin Wu, Hui Gao, Bing Liu, Jie Wang, Xiangwen Meng, Zuohua Huang, "Investigation on Characteristics of Ionization Current in a Spark-Ignition Engine Fueled With Gas-Hydrogen Blends With BSS De-Noising Method", International Journal of Hydrogen Energy—35, 2010, pp. 12918-12929.

"Delphi Ionization Current Sensing Ignition Subsystem" Delphi, Powertrain Systems, internet download 2012, pp. 1-4.

* cited by examiner

METHOD AND PROCESSING SYSTEM OF SENSED IONIZATION CURRENT DATA FOR REAL TIME ESTIMATION OF COMBUSTION CHAMBER PRESSURE IN A SPARK IGNITION ENGINE

CROSS REFERENCE TO RELATED APPLICATIONS

This application claims the priority benefit of Italian Patent Application No. MI2013A000750, filed May 9, 2013, and which application is hereby incorporated by reference to the maximum extent allowable by law.

BACKGROUND

Technical field

The present disclosure relates in general to data acquisition and processing for real time diagnostic and/or control of the functioning of a spark ignition internal combustion engine through evaluation of operating parameters and in particular to "sensorless" evaluation of the pressure in the combustion chamber from waveform feature data of the sensed ionization current.

Discussion of the Related Art

In the last decades, ionization current diagnostics has proven itself to be an effective approach in investigating the mechanism of fuel combustion and optimizing spark-ignition (SI) engine control.

Monitoring of ionization current waveform in SI engines fueled with gasoline or different fuels and sophisticated calibrations are currently used for online diagnosis of misfirings and knock detection, cam phase determination, air/fuel ratio estimation, cylinder pressure estimation and peak cylinder pressure position estimation [1-5].

Most SI engines function with an inductive ignition system. However, large ignition discharge currents can mask ionization current at the beginning of propagation of the combustion (during a so-called front flame phase of the combustion process). During initial flame propagation the ionization current that is significantly masked by the spark discharge current remains hardly detectable if the discharge current of the inductance of the spark plug circuit persists long after ignition starts. How to discriminate the interference of ignition discharge current from the ionization current has been and a key issue for a long time in the ionization current measurement technical field.

Filtration by the so-called "Blind Source Separation" (BSS) method of monitored current, in which the independent original signal can be extracted from the statistically independent source signals, may be a way to discriminate the ignition spark discharge current from ionization current, however the effort may be ineffective in case of significantly corrupted current signals. In any case for achieving reliable analytic diagnosis and/or indirect assessment of important characteristics of the combustion process complex independent component analysis methods should be used [1].

It is observed that high frequency components of the current may hardly circulate both in the primary or secondary windings of the ignition coil, thus they tend to flow through parasitic capacitances towards the supply node of the first spark electrode and then to ground and/or are dissipated as waste heat in the magnetic core of the ignition coil. Therefore, potentially useful information derivable from sensed current data gathered during the crucial ignition and the flame-front phases remains unexploited.

Detection of the low frequency current circulating in the primary circuit of the HV coil is an approach followed in known Delphi and Bosch systems, however the approach allows only the detection of the post spark ion current and requires the use of auxiliary components as HV diodes, capacitors, resistors and/or a DC supply [2].

Reportedly, monitoring of the ionization current "during initial spark phases" has been achieved with additional electrodes inside the combustion chamber.

In the prior Italian patent application No. MI2001A001896, the present applicants disclosed an effective device and circuit arrangement for significantly reducing shortcomings of traditional sensing schemes and related hardware to sense ionization current (sometimes called ion current) during the first two phases, namely the ignition phase and the flame-front phase.

As described in the above cited prior application, the problem is alleviated by providing a resistive element connected to the ground electrode of the spark plug, such that when the spark plug is mounted in a SI engine combustion chamber, the ground electrode of the spark plug becomes electrically connected to the engine body through a resistive element interposed therebetween in the flow path of the ionization current. Moreover, according to a disclosed embodiment, the ground electrode of the spark plug is provided with an appendix adapted to constitute an accessible current sense terminal outside the combustion chamber or wired to it. In this way, it is made possible to detect with enhanced discrimination the ionization current even during the ignition and flame-front phases by sensing the voltage between the integrated sensing terminal and the ground node constituted by the engine body. The whole content of the above cited Italian patent application is incorporated herein by express reference.

SUMMARY

The ability of sensing the current flowing to ground from the ground electrode of a spark plug on a current sensing resistance, processing the voltage signal to filter out high frequency noise and disturbances caused by the spark discharge across the gap, and A/D converting the filtered signal for temporarily storing the data on an appropriate memory (for example a RAM) has enabled the inventors to achieve a clear definition of the waveform of the ionization current even at the ignition instant and flame-front phases of the combustion process.

Extensive laboratory tests on a static mock-up spark plug ignition chamber (for eliminating interactions among spark discharge, ignition and flame propagation mechanisms in a real engine cylinder), equipped with pressure and temperature sensors, confirmed the existence of exploitable correlations between the pressure in the combustion chamber (CCP) and instrumentally detectable or calculable features of the ionization current waveform, such as:

a) the time delay (TD), from the instant of generation of a ignition triggering signal by an engine controller to the instant the sensed current signal of pre-ionization of the gas mixture swings down from a typical latency plateau (corresponding to a pre-ionization phase of the gas mixture being ignited) to the instant of ignition of the gas mixture, initiating a first cycle of a typical decaying oscillatory full ionization current phase, due to the reactive electrical characteristics of the spark plug circuit;

b) the asymptotic value of the ionization current;

c) the amplitude of the first ringing (or 1$^{st}$ harmonic) peak, I_rng FFT (calculated by Fast Fourier Transform algorithm) of the decaying oscillatory part of the ionization current waveform;

d) the amplitude of detected peaks (or envelope function) of the decaying oscillatory part of the ionization current waveform.

The correlation between the delay time TD and the charge pressure (of the compressed gas mixture being ignited) is explainable in terms of the relation between the breakdown voltage, $V_{bd}$, gas pressure P, gas temperature T, and electrode gap distance d, as described by the Paschen's law Vbd≈($\alpha$·P·d)/T+$\beta$·√(P·d/T), where constants $\alpha$ and $\beta$ substitute the actual numerical constants used in Paschen's equation as it was originally derived for a spark discharge into dry air and not into a fuel/air mixture (which might also contain moisture) [4], [5]. Since the spark plug high voltage increase rate mostly depends on the characteristics of the HV electrical inductive ignition system, the applicants conceived that a noted dependence of the TD/CCP correlation on the actual temperature (T) of the gas mixture compressed into the test combustion chamber could be accounted for by parameterizing in some manner a TD/CCP correlation characteristic in terms of temperature by repeating the TD measurements at various CCP values for different temperatures, covering the expected range of variability of the charge temperature and that, in a real engine context, wherein many other environmental parameters and/or engine control settings, such as the actual composition of a ambient air and gasified fuel mixture, its moisture content, crank angle, RPM, etc. play a role in the ignition and flame front expansion process that affects the pressure profile, a way of correlating, in real time, data extracted from an effectively monitored ionization current waveform with other environmental parameters and/or settings in order to generate estimated values of pressure of enhanced reliability and optionally even of other important operation parameters could be feasible.

According to the method of this disclosure, similar parameterizations of the TD/CCP correlation are reliably established, besides for temperature, also for many other variable environmental parameters or differently expressed parameters, other than temperature, such as air/fuel ratio (briefly AFR) or throttle position, manifold pressure, crank angle, RPM of the engine, etc., by generating, through a calibration campaign of tests conducted on a real combustion chamber of identical geometry and characteristics of the engine cylinders (most preferably on a test engine purposely equipped with pressure, AFR, temperature sensors and/or of actual engine control settings), a specific matrix (or look-up table) of time invariant correlation coefficients, covering the respective ranges of variability of the various parameters and/or settings.

Such a trimming of time invariant correlation coefficients has revealed itself as a very effective way of accounting for parameters and settings that influence the estimation of CCP on the basis of measured and/or calculated features of the monitored ionization current waveform.

The utter complexity of accounting for every single parameter that may affect the TD/CCP correlation as well as other useful correlations with other important parameters and/or engine control settings derivable from the detectable and/or real time calculable features of the ionization current waveform, is generally overcome by exploiting the fact that certain electrical and physical characteristics of the spark plug ignition and combustion system of an engine may be considered to remain substantially constant when the engine is running (being due to its mechanical construction, frictional forces, electrical system, etc.).

According to an embodiment, a mathematical model of the electrical and physical spark plug ignition system and combustion chamber accounting for these time invariant parameters is refined through a calibration campaign of tests conducted on a test engine purposely equipped with pressure, AFR, temperature sensors and/or of the actual engine control settings. Accordingly, the time invariant correlation coefficients of said specific matrix (or look-up table), covering the respective ranges of variability of the various parameters and/or settings, are progressively adjusted by "trial-and-error" process, iteratively testing their interactive "performance" when used as coefficients of the various terms of the expression of the mathematical model of the electrical and physical spark plug ignition system and combustion chamber that generates an estimated pressure value in function of a current set of variable parameters and/or control settings of the test engine (i.e. the terms of the mathematical expression), by comparing it with the real pressure value as measured by the sensor. Iterative and/or heuristic (e.g. genetic algorithms) are generally usable for interactively refining the time invariant coefficients.

When the mismatch between the estimated pressure value generated by the mathematical model is finally reduced to be within an admitted maximum spread (tolerance), the set of time invariant correlation coefficients is permanently stored in said matrix or look-up table.

According to an embodiment, such a matrix (TI) of correlation coefficients compiled at a calibration stage of the ionization current data acquisition set-up conducted on a given type of engine purposely equipped with pressure, temperature, AFR and eventually other sensors and/or readers of actual control settings, running on a test-bench, represents a time invariant (or substantially so) correlation tool that, embedded in an on-board combustion chamber pressure monitoring system, replicating the ionization current monitoring and data acquisition/real time processing structures used for the calibration campaign and post-processing means using the same mathematical model of the real engine, the current instantaneous value of the pressure and optionally even an averaged pressure value over a given number of engine cycles are output.

Therefore, combustion chamber pressure and optionally even other important variable parameters, like the AFR and crank angle, are made monitorable without deploying specific sensors, from detected and/or calculated features of the monitored ionization current waveform. Such reliably assessed values of basic variable operation parameters may be fed to a common engine controller.

Besides the measurable ignition delay time TD, several calculable features of the filtered ionization current waveform, such as the asymptotic value the peak amplitude, or oscillatory decay envelope function, of the monitored ionization current, and in particular the first harmonic frequency and the FFT first harmonic frequency peak amplitude, offers an enhanced discrimination, moreover, differently from the TD/CCP correlation, FTT data (first ringing frequency and related peak amplitude in the frequency domain) appears to be practically unaffected by the charge temperature (T) and less corruptible by disturbances (spurious sample data). These options of feed data of the sensed ionization current, usable for producing estimated values of the pressure by correlation, offer innumerable possibilities of enhancing robustness of the data processing.

1. A method of real-time evaluation of at least the pressure in the combustion chamber of an electronically controlled spark plug ignition engine by sensing the ion current flowing through the spark, comprising the steps of:

refining a mathematical model of the electrical and physical spark plug ignition system and combustion chamber of the engine through a calibration campaign of tests conducted on a test engine purposely equipped with specific sensors of combustion chamber pressure, ambient temperature, air/fuel ratio or correspondent throttle setting, and of other engine control settings, covering the respective ranges of variability of said parameters and/or settings, by iteratively testing the interactive performance of correlation coefficients of related terms of a mathematical expression of said model and comparing the expressed pressure value with the real pressure value as measured by a sensor;

storing in a matrix or look-up table a set of time invariant correlation coefficients of said terms when the residual mismatch between the estimated pressure value generated by the mathematical model compared with the measured value remains within a maximum spread; and sensing the ionization current in the running engine, measuring or calculating at least one or more significant features of the waveform of the sensed ionization current and processing any or more measured or calculated feature values together with said matrix of time invariant coefficients and with a set of actual values of said parameters other than pressure and/or of said control settings of the running engine for producing an evaluated value of the combustion chamber pressure.

2. The method of real-time evaluation of the combustion chamber pressure according to claim 1, wherein said significant features of the waveform of the sensed ionization current signal belong to the group composed of the time delay of the beginning of an oscillatory decay phase of the monitored ionization current from an electronically controlled generation of a trigger signal of the spark plug discharge, the calculated amplitude of the first ringing frequency peak in the FFT domain, the calculated asymptotic current value, the calculated amplitude of resonance peaks or envelope function and the time width of current peaks of said oscillatory decay phase of the ionization current.

3. The method of real-time evaluation of the combustion chamber pressure according to claim 2, wherein the measured significant feature of the waveform of the sensed ionization current signal is the time delay of the beginning of an oscillatory decay phase of the monitored ionization current subsequent to said trigger signal of a spark plug discharge and further comprising the step of defining the length of a data acquisition time interval, following said delayed instant, from which calculating any or all said features of the monitored portion of the ionization current waveform.

4. The method of real-time evaluation of the charge pressure according to claim 1, further comprising the steps of processing of the acquired data of the ionization current signal over a programmable data acquisition time interval for outputting instantaneous values of any or all said features of the monitored portion of the ionization current waveform;

averaging over a given number of engine cycles any or all of said measured or calculated features for selectively outputting the instantaneous and the averaged values of any or all said features; to produce continuously updated vectors of values of said calculated features of the monitored portion of the ionization current waveform for a given number of engine cycles;

feeding said selected instantaneous or averaged values of any or all said features together with said matrix of time invariant coefficients and with a set of actual values of said parameters other than pressure and/or of said control settings of the running engine to a correlator embedding said mathematical model of the electrical and physical spark plug ignition system and combustion chamber of the engine, for generating on respective outputs correspondingly evaluated instantaneous and averaged values of the combustion chamber pressure.

5. The method of real-time evaluation according to claim 1, wherein a one or more spark discharges are purposely commanded after ignition has taken place for gathering multiple estimated instantaneous values of the pressure in the combustion chamber over a complete ignition-flame propagation-full combustion-exhaust process.

BRIEF DESCRIPTION OF THE DRAWINGS

Non-limiting and non-exhaustive embodiments are described with reference to the following drawings, wherein like labels refer to like parts or variables throughout the various views unless otherwise specified. One or more embodiments are described hereinafter with reference to the accompanying drawings in which.

DETAILED DESCRIPTION

Figure 1:
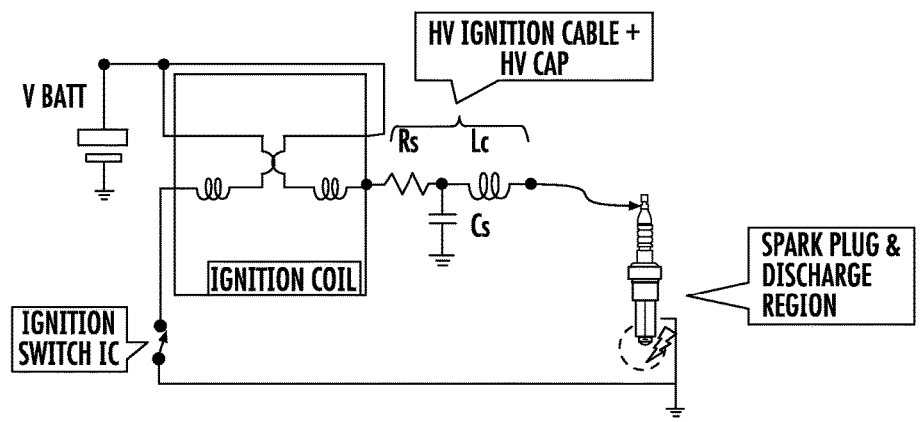
FIG. 1 illustrates the typical spark plug circuit and the associated timing diagram of the idealized waveforms of the significant electrical signals.
Figure 1:
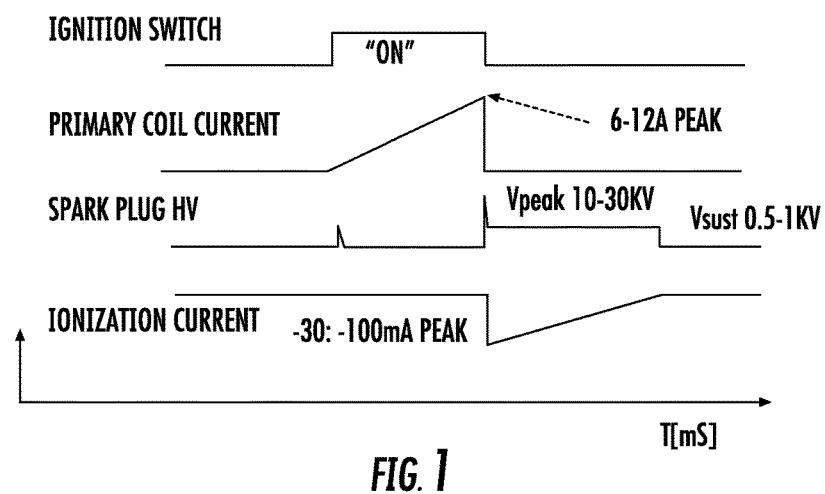
Figure 2:
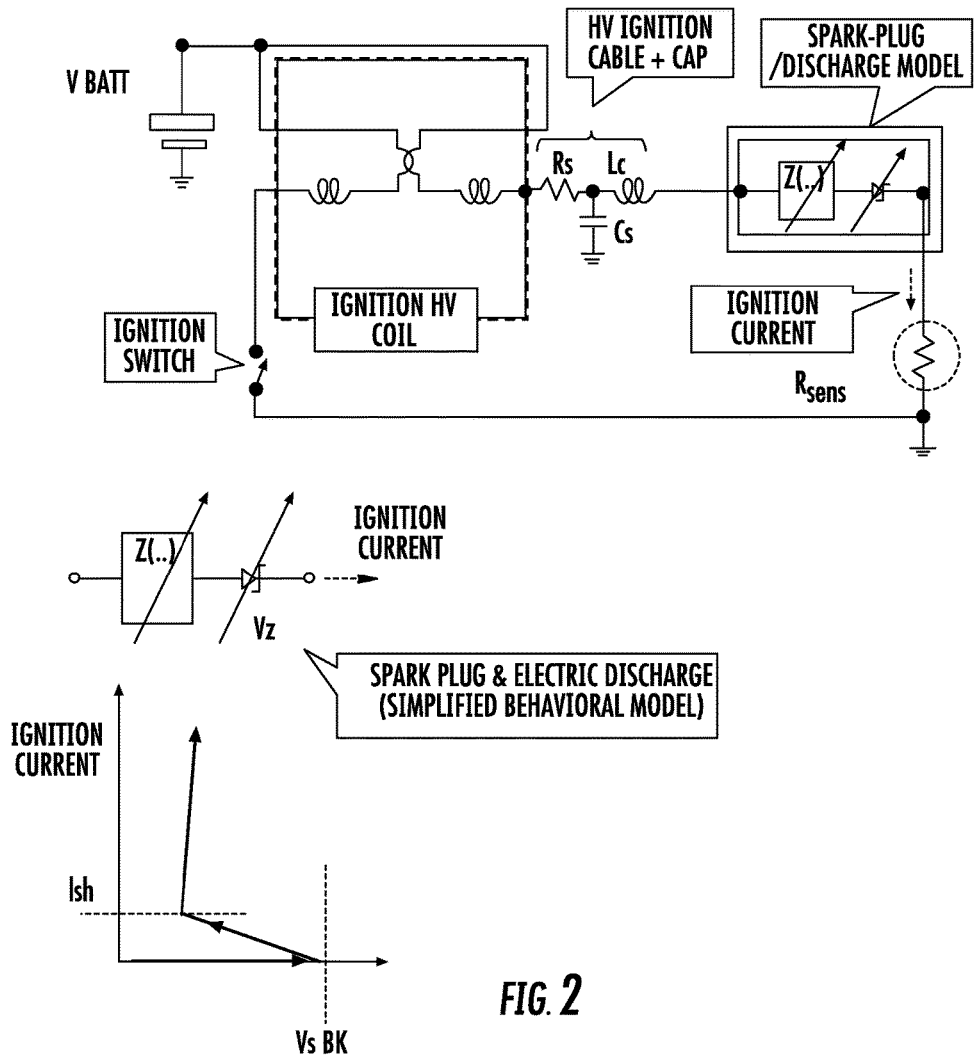
FIG. 2 illustrates the modeled electrical spark plug circuit of FIG. 1 further including a current sense resistor in series with the ground electrode of the spark plug in the current path toward the circuit ground node and the basic current-voltage characteristic.

A typical spark plug circuit and the associated timing diagram of the idealized waveforms of the significant electrical signals and typical signal amplitudes are shown in FIG. 1, whilst a simplified correspondent analytical model of the electrical spark plug circuit of FIG. 1 further including a current sense resistor in series to the ground electrode of the spark plug and the basic current-voltage characteristic are shown in FIG. 2. FIG. 3a is a simulated waveform of the voltage drop on a 50Ω current sensing resistor of the analytical model considered of FIG. 2.

Figure 3B:
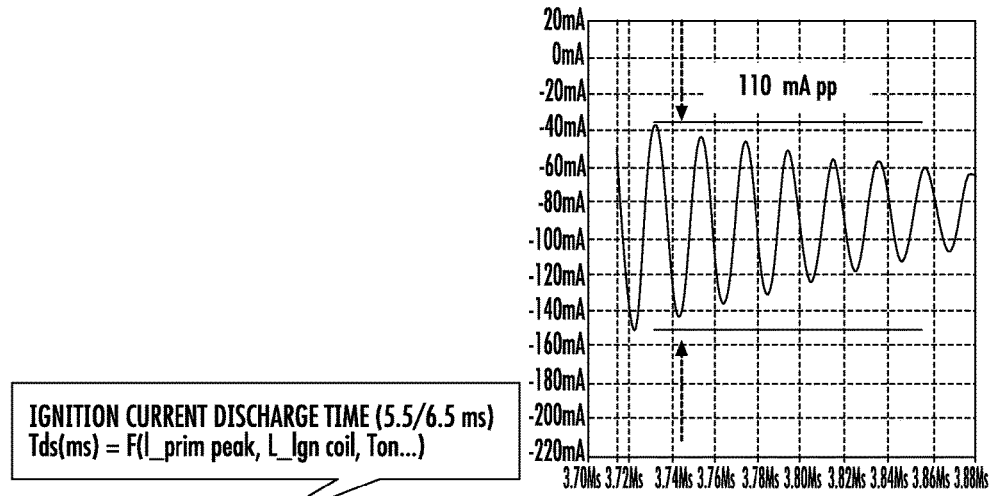
FIG. 3b shows the decaying oscillatory ionization current signal, sensed during a full ionization phase of the combustion process.
Figure 3A:
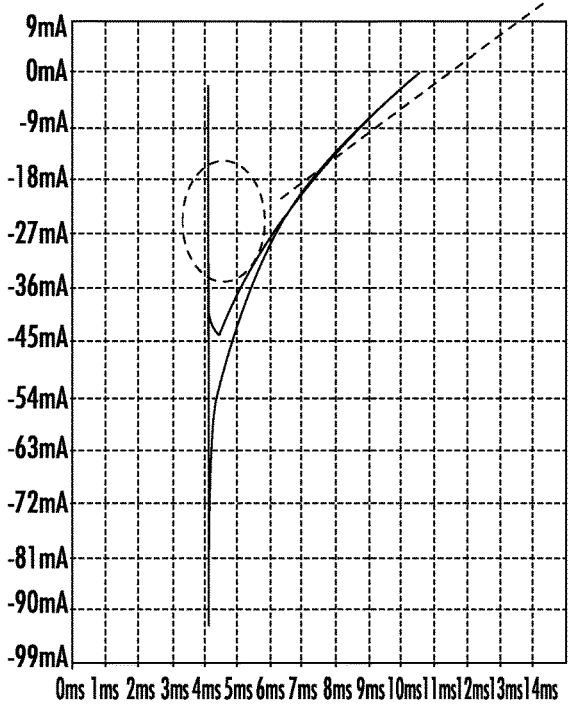
FIG. 3a is a simulated waveform of the voltage drop on a 50Ω current sensing resistor for a combustion chamber of the model considered in FIG. 2.

FIG. 3b shows a portion of the simulated decaying oscillatory ionization part of the current signal during a full ionization phase of the combustion process.

Figure 3C:
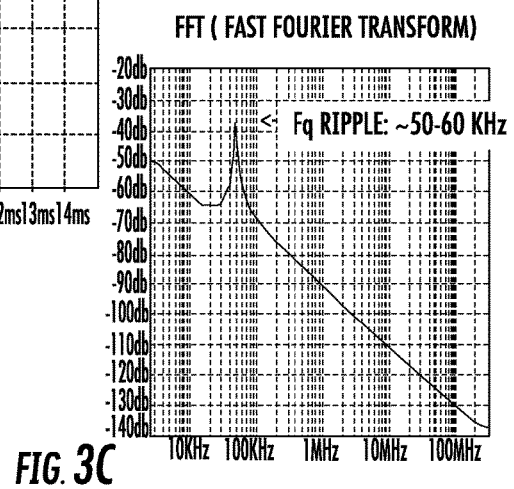
FIG. 3c shows in a logarithmic scale the main ringing peak of the sensed ionization current in the Fourier transform domain.

FIG. 3c is a logarithmic scale illustration of spectral contents in the frequency domain of the simulated decaying oscillatory ionization part of the ionization current calculated by Fast Fourier Transform.

Figure 4:
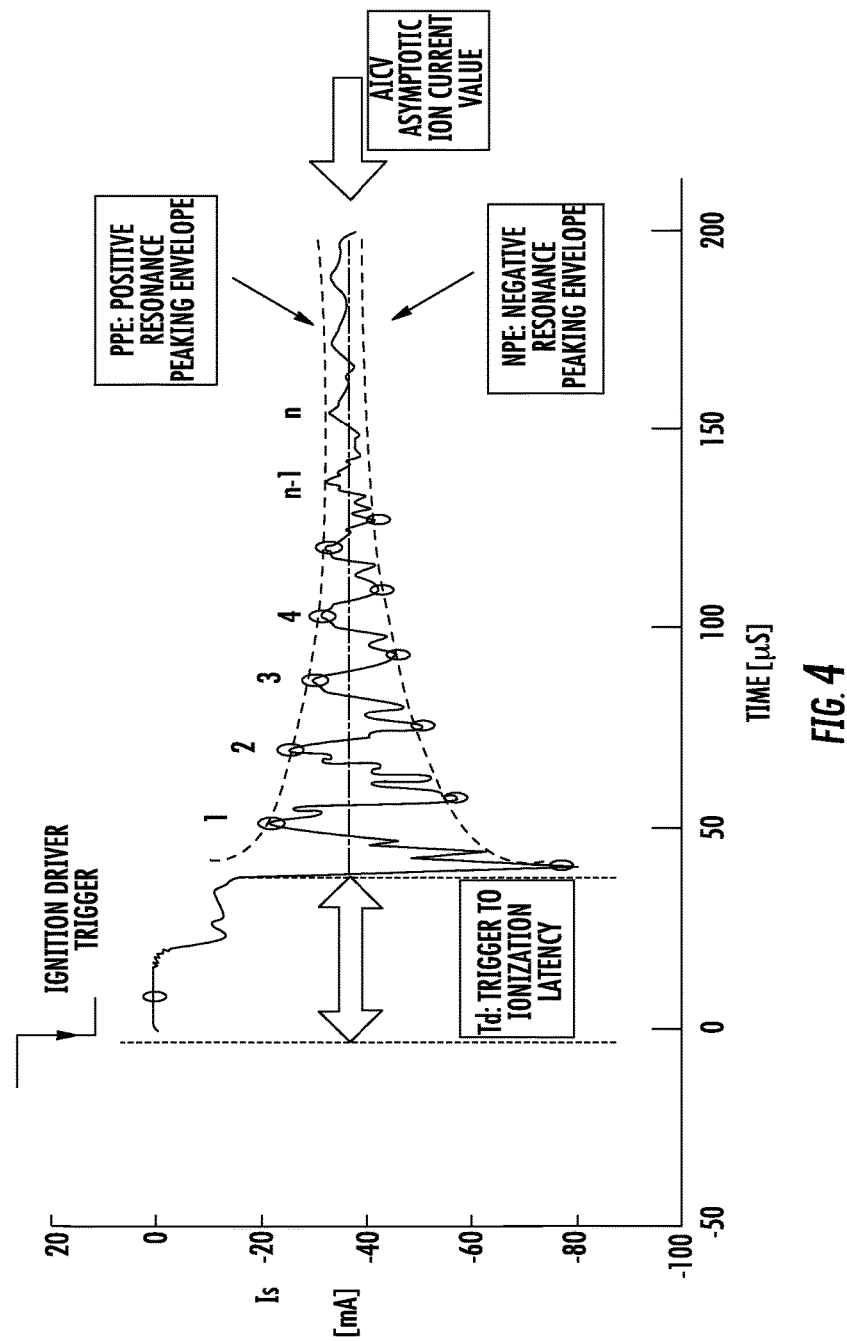
FIG. 4 is an oscillograph of the voltage drop on a 50Ω current sensing resistor, monitored during a full ionization phase of the ignition process within a mock-up test combustion chamber, showing features that have been found to have a direct correlation with the pressure of the gas mixture introduced (charge pressure) in the chamber.

A typical waveform (filtered from high frequency disturbances) of the ionization current flowing to ground from the ground electrode of the spark plug during the initial phases of discharge of the ignition coil, of ignition of the gas mixture and of the flame front propagation process is reproduced in FIG. 4.

Features that have been found to have a direct correlation with the pressure of a given gas mixture introduced in the chamber and compressed therein and thence of the burning mixture are recalled by self-explaining labels: TD, PPE, NPE and AICV, and by the first harmonics ringing peak amplitude in the FFT domain.

The delay TD is the latency between the instant the spark plug ignition of the compressed gas mixture in the combustion chamber is triggered and the instant at which a substantially full ionization across the spark gap is achieved (spark) causing an abrupt negative swing of the sensed ion current amplitude from a modest negative current plateau reached during an initial phase of progressive ionization of gas molecules not jet ignited in the spark gap region. The significantly reactive electrical characteristics of the spark plug circuit cause the ionization current to have a decaying oscillatory waveform.

Repeated laboratory tests on a mock-up spark plug ignition test system of geometry identical to that of the real engine cylinder (to avoid interactions with gas mixture combustion and/or the gas discharge phase of the real engine) have indicated a direct correlation between the charge pressure (pressure of the gas mixture being ignited) of precisely defined air-fuel gas mixtures inside the test combustion chamber and the ignition delay time TD.

Figure 5:
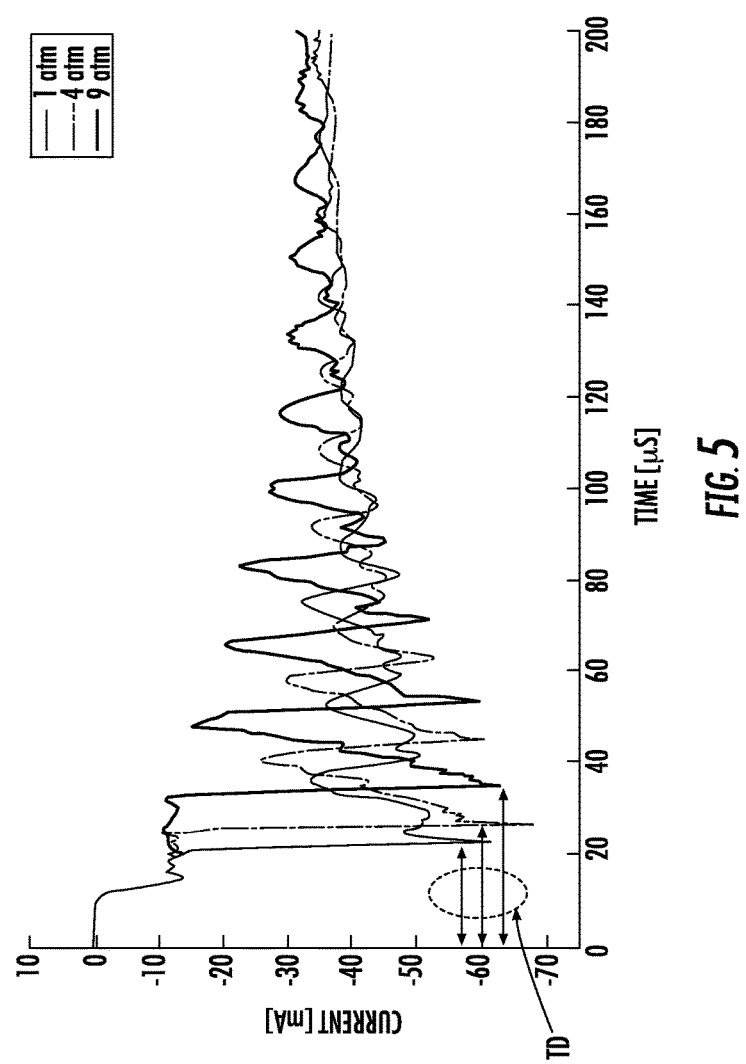
FIG. 5 shows the detected ionization current traces at three different charge pressures of the gas mixture to be ignited and the correlation the traces have with the delay time (TD) of ignition.

FIG. 5 shows the detected ionization current traces for three different charge pressures of a given gas mixture of a certain air-to-fuel ratio (AFR) being ignited and it is clearly observable the evident correlation the traces have with the respective delay times TD highlighted by the arrows.

Figure 6:
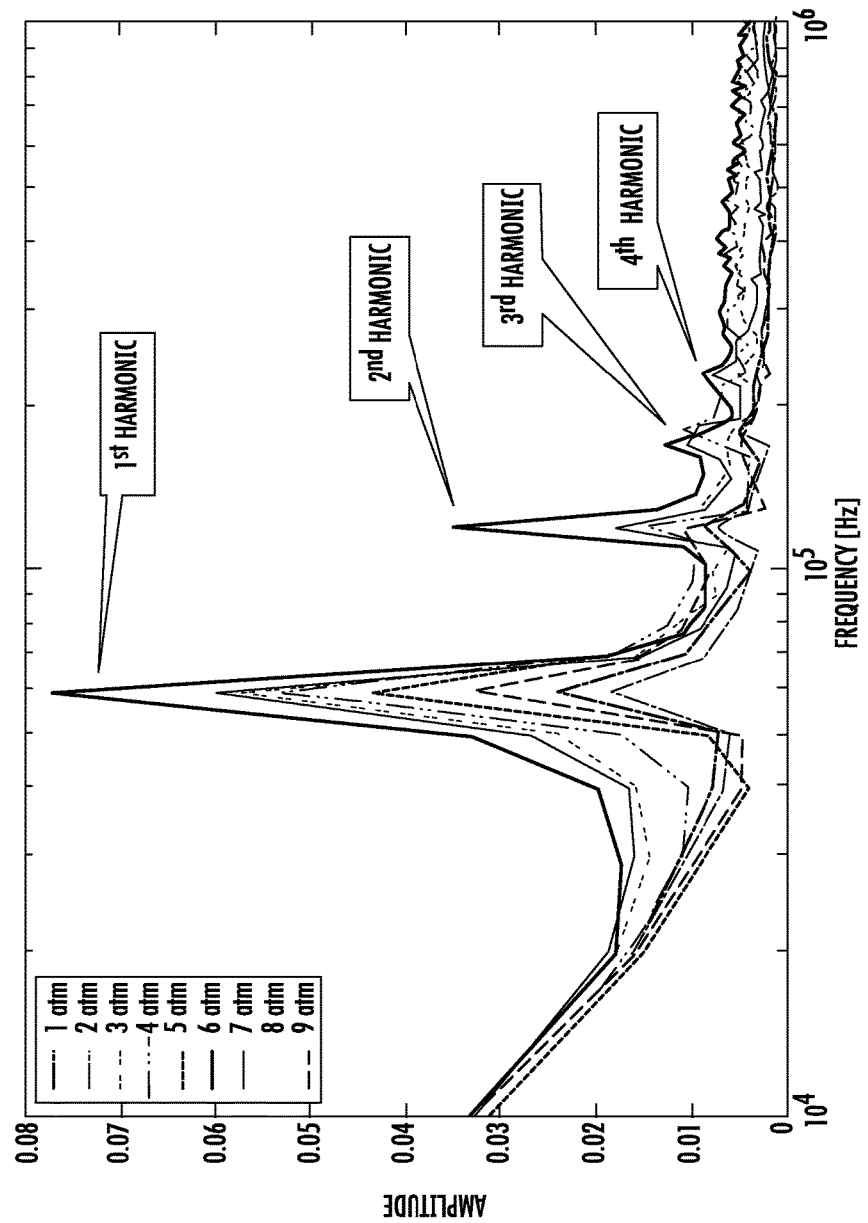
FIG. 6 shows the correlation with first harmonic frequency and with the amplitude of the first ringing peak in the Fourier Transform frequency domain of the ionization current with the pressure of the gas mixture ignited.

The reactive characteristic of the spark plug circuit causes the ionization current to have a decaying oscillatory waveform of a well-defined frequency and sampled current data of several cycles of oscillation may be processed by Fast Fourier Transform to determine the spectral contents within the observed/selected time interval, in particular the main ringing frequency (first harmonic) and amplitude of the relative peak. In the FFT frequency domain, the frequency of the first harmonic peak as well as its amplitude have a clear correlation with the charge pressure of the gas mixture being ignited. FIG. 6 shows traces of the main ringing frequency peaks for the indicated nine different values of charge pressure.

Figure 7:
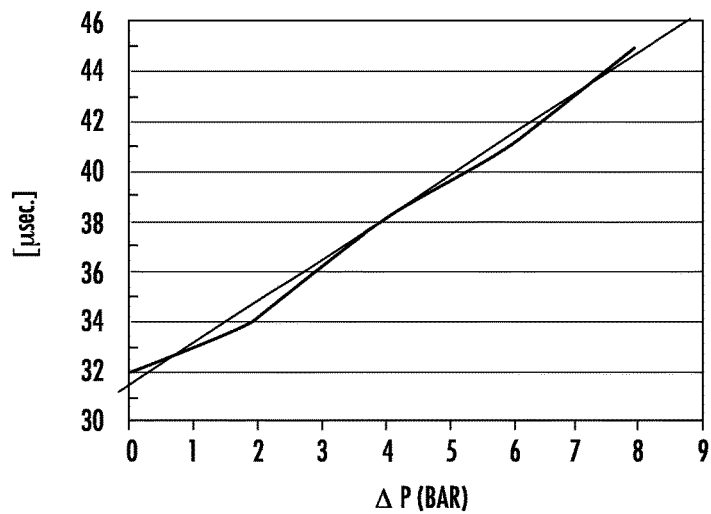
FIG. 7 shows an experimentally determined characteristic curve of correlation between the ignition delay time and the charge pressure of the gas mixture.
Figure 8:
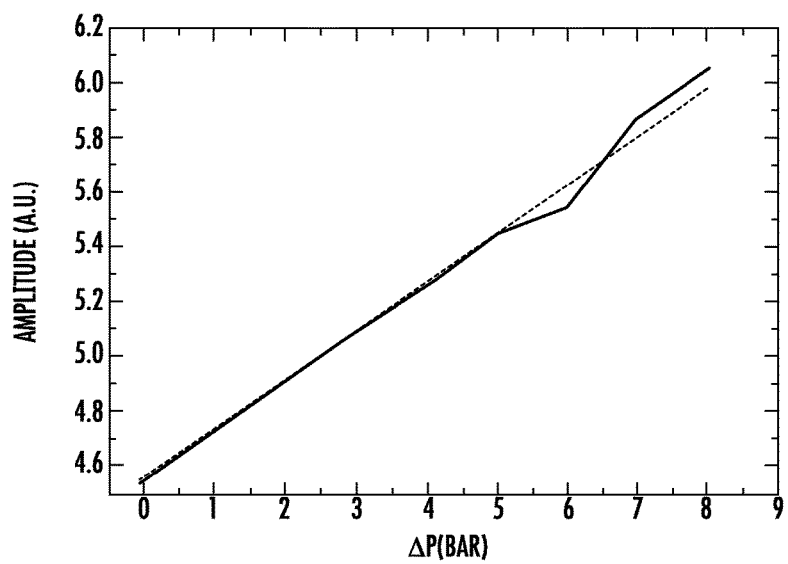
FIG. 8 shows an experimentally determined characteristic curve of correlation between the amplitude of the main ringing frequency peak in the Fourier transform frequency domain of the sensed ionization current and the charge pressure of the gas mixture.

From collected experimental values, all obtained at the same temperature of the charge gas mixture of same AFR, were obtained the curves of correlation shown in FIG. 7 and in FIG. 8, for the detected TD and for the main ringing frequency peak amplitude, respectively. Though of lesser resolvability, distinct correlation characteristics were found also between the pressure and the amplitude of the ionization current peaks or of negative and positive envelope, NPE and PPE respectively, and the asymptotic value AICV of the oscillatory decaying waveform of the ionization current.

Figure 9:
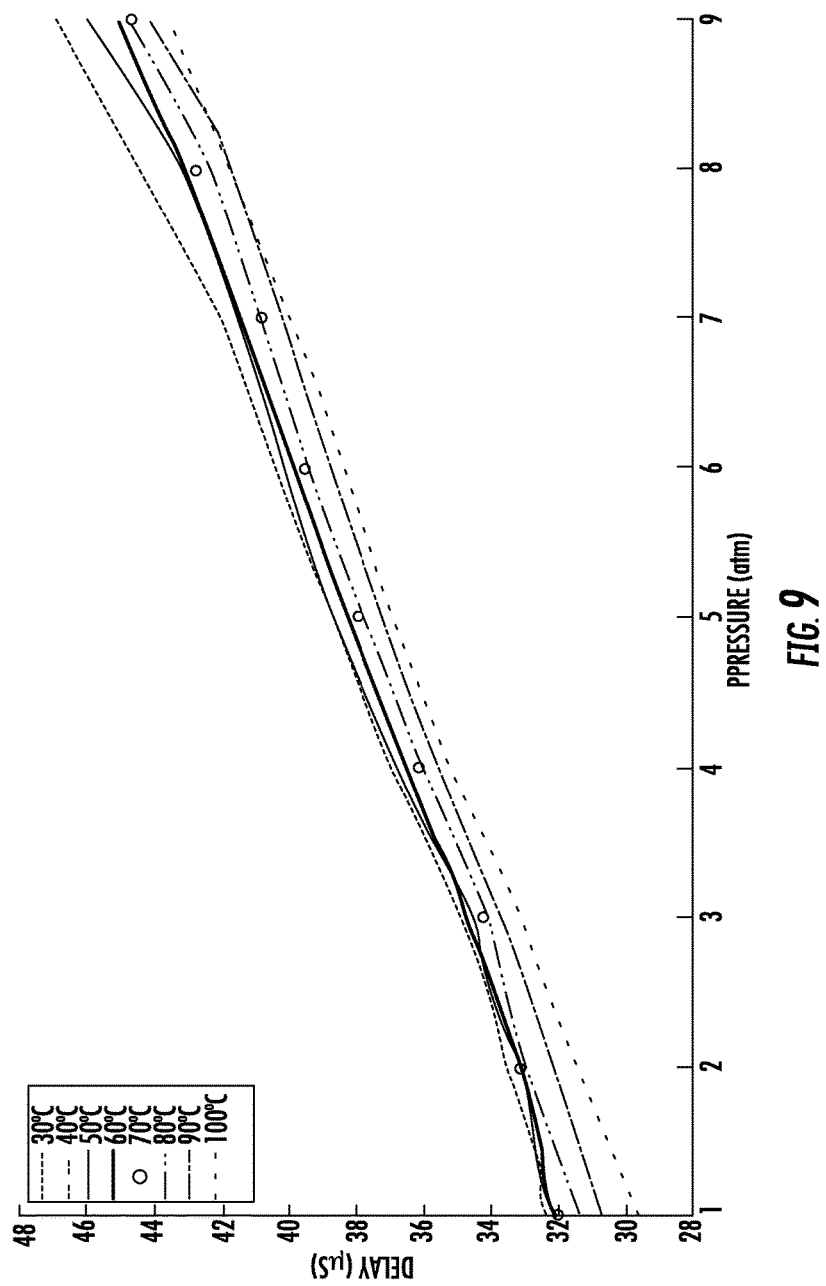
FIG. 9 shows several experimentally determined correlation curves of the ignition delay time and pressure at different charge temperatures of the gas mixture into the combustion chamber.

The effect of the charge temperature has been investigated in the range from 30° to 100° C. and found to have a non-negligible effect on the delay time of ignition and a practically negligible effect on main ringing frequency peak amplitude. FIG. 9 shows how the characteristic of correlation of TD with charge pressure is affected by varying the charge temperature.

Figure 10:
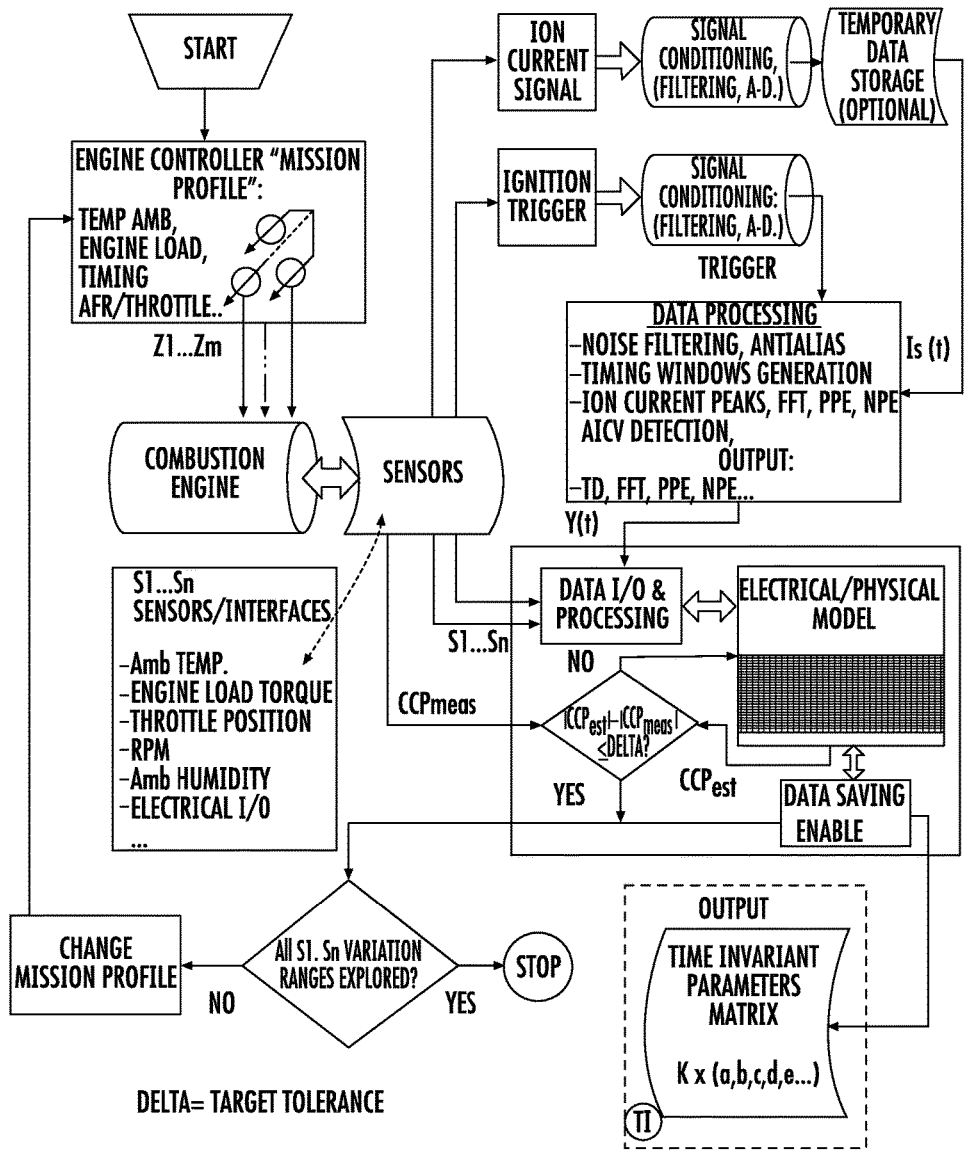
FIG. 10 is an exemplary embodiment of suitable measurement set-up and calibration flow chart for a specific real engine adapted to generate a matrix (look-up table) of time invariant correlation coefficient values.

An exemplary embodiment of suitable measurement set-up and of a flow chart of calibration based on the definition of a mathematical model of the electrical and physical spark plug ignition system and combustion chamber of a real engine adapted to generate a matrix (look-up table) of substantially time invariant correlation coefficient values is illustrated in FIG. 10.

The electrical signal data being acquired with the measurement set up are the ignition trigger signal and the ionization current signal. The sensed signals are filtered and converted into digital sampled data and the ionization current data are temporarily stored in a work RAM.

According to the embodiment considered, the calibration flowchart comprises a data processing block of the stored sampled ionization current data Is(t) of a test engine running on a laboratory bench, purposely equipped with specific sensors of the actual pressure inside the engine cylinders. Besides measuring the ignition delay TD and defining a time window of sampled ionization current data analysis following the ignition instant, the Data Processing block may selectively perform a plurality of operations on the data Is(t) read from the temporary data storage support, including: digital noise filtering, anti-aliasing filtering and calculation of specific feature values of the waveform of the ionization current within said defined time window of sampled ionization current data analysis, following the ignition instant, such as PPE, NPE, AICV and FFT features.

A full set of variable operating parameters and/or settings values of the test engine (S1, S2, . . . Si, . . . , Sn), corresponding to ambient temperature (Z1), the load on the engine shaft (Z2), the ignition timing or crank angle (Z3), the actual air/fuel ratio (AFR) or throttle (Z4), etc. (Zm), for a given operation condition (or mission) profile of the test engine (as precisely acquired though a suitable interface of an engine controller or directly determined by specific sensors) are fed together with the calculated ionization current waveform features Y(t) produced by the Data Processing block, to a I/O Data block and eventually to an Electrical/Physical mathematical model of the electrical and physical spark plug ignition system and combustion chamber of the test engine. Accordingly, the set of input data Y(t) and Z1, Z2, . . . Zm will generate an estimated value of the pressure CCPest on the basis of respective weighting coefficients b/a, c/a, d/a, e/a, . . . , n/a of the variable parameters and/or settings of the considered profile.

These coefficients a, b, c, d, e, . . . n that tie the parameters and/or settings Zi for a given mission profile to the pressure inside the engine cylinders (CCP) and that should ensure a match of the mathematical model with the real engine, are individually established through successive iterations during which the Zi values are changed by the engine controller. The minimum number of iterations depends by the number of correct coefficients to be searched, plus one.

At every cycle of iteration, the generated estimated value of the pressure CCPest is compared with the actual pressure CCPmeas measured by the pressure sensor and the mismatch between the two values is checked with a threshold of admissible spread (target tolerance) for the particular coefficient being searched.

If in the course of the iterations one or more coefficients remain constant, the degree of complexity of the matrix TI of dimension K being generated will be reduced because of a broader validity of those coefficients upon the variation of one or more of the parameters and/or settings Zi fed to the model. In general terms, Y(t) represents the information extracted (by measurement or calculation) from Is(t) to be correlated to the pressure CCP, for example TD, FFT $1^{st}$ ringing peak amplitude, or other feature of the ionization current waveform that, during the calibration campaign, shows to be well correlated to CCP and comparably the least sensitive to other parameters.

Supposing Y(t) to be the measured ignition delay TD found to vary linearly with CCP according to the relationship traced in FIG. 9 and that TD is found to be substantially insensitive to other parameters and settings apart ambient temperature Troom. In this case the number of parameters Si to be processed will be equal to 1. Supposing to divide in 10 intervals the contemplated range of CCP in order to have an acceptable precision and that to stay within the admitted spread 5 different values of ambient temperature should be considered, the dimension of the matrix TI to be produced will be K=10*5=50. The dimension K increases rapidly with the number of parameters Si that have a non negligible effect on the correlation between the selected feature of the ionization current waveform and CCP.

Once the trimming process of the correlation coefficients to be written in the output matrix TI is completed, that is when acceptability of the coefficients has been verified for every set of control variable parameters and/or settings (mission profile) fed to the mathematical electrical/physical model, the thus established coefficients of correlation will constitute the correlation matrix TI, to which the on board sensor-less system of real time estimation of the CCP value of this disclosure will access for correlating the measured or calculated feature value of the monitored ionization current waveform to a correspondent pressure value using the same mathematical electrical/physical model defined during the calibration campaign.

Figure 11:
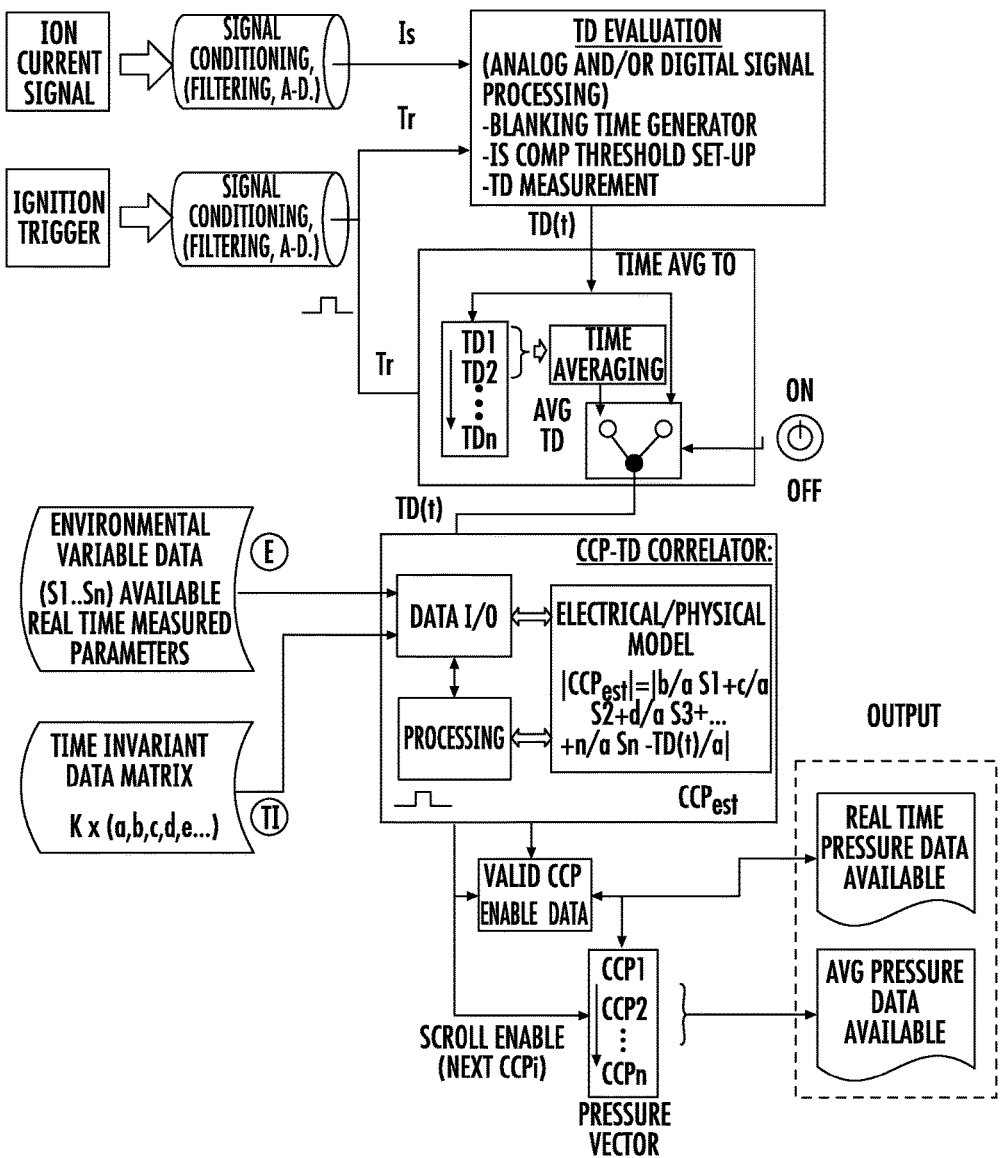
FIG. 11 illustrates a scheme of ionization current data acquisition, ignition time delay measurement and real time data processing for producing estimated instantaneous and averaged values of charge pressure value, according to a first embodiment.

FIG. 11 illustrates a system of real time combustion chamber pressure evaluation, according to a first exemplary embodiment of this disclosure, based on TD/CCP correlation.

The on-board data acquisition set-up for monitoring the ignition trigger signal and for measuring the ignition delay ionization current signal may be substantially a replica of that used for the calibration campaign of laboratory tests on a test engine equipped with pressure sensors illustrated in the block diagram of FIG. 10.

The block TD Evaluation detects the ignition trigger signal and measures the actual ignition delay TD of the air/fuel compressed gaseous mixture within the combustion chamber, for example by iteratively incrementing the width of an initial blanking pulse until its width is made to coincide with the ignition delay time TD or equivalent technique.

The measured values TD(t) may optionally be averaged over a given number of engine cycles as depicted by the block Time AVG TD.

The measured TD(t) value is fed together with the current set of Environmental Variable Data and the Time Invariant Data Matrix to the block CCP-TD Correlator embedding the same Electrical/Physical Model of the electrical and physical spark plug ignition system and combustion chamber of the engine used in the calibration campaign of tests for generating and making available on respective outputs, instantaneous and averaged values of real time estimated CCP pressure.

Figure 12:
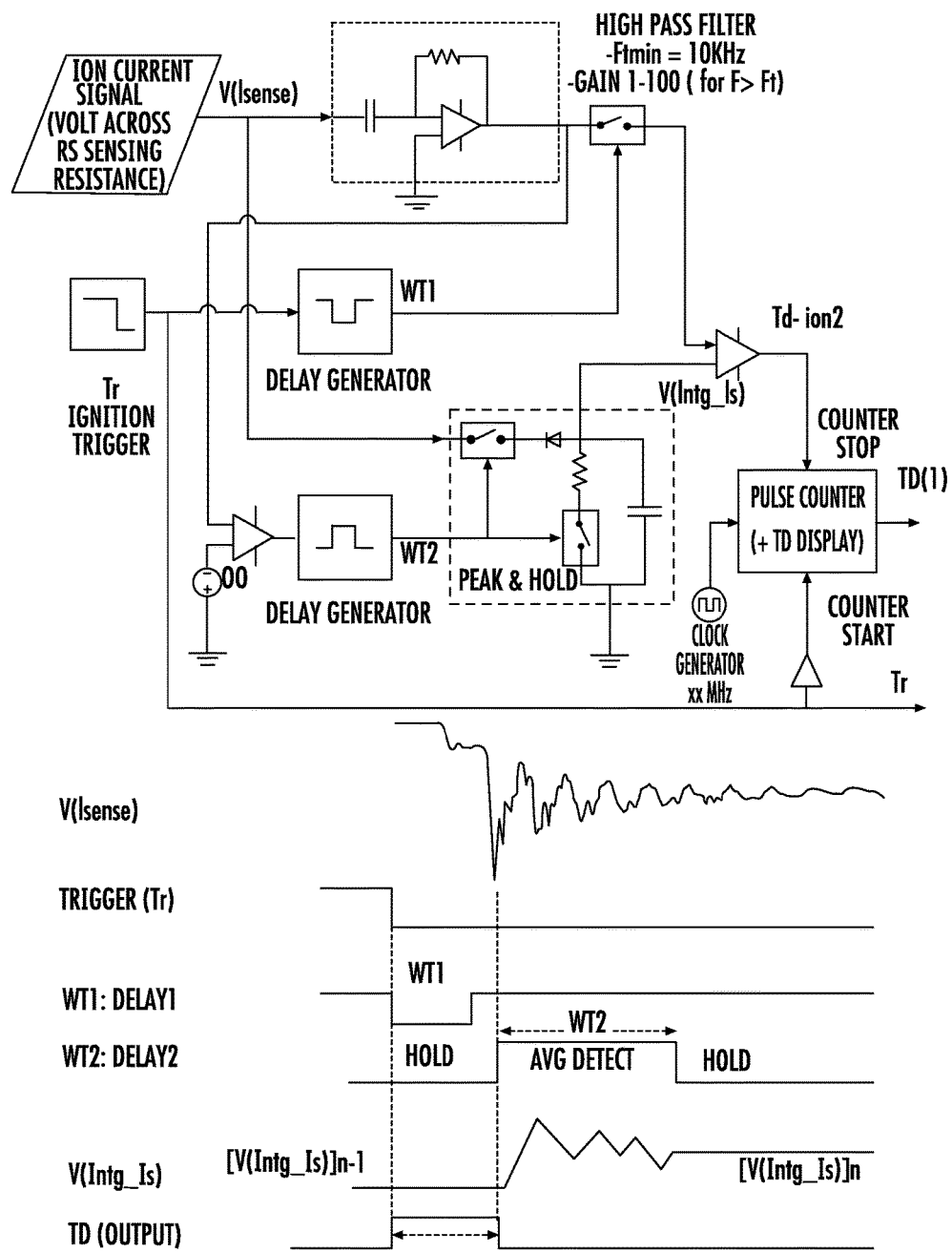
FIG. 12 illustrates a circuit diagram for real time measurement of the ignition delay time and of a time interval following the ignition instant, setting the duration of a sample data acquisition window of the monitored ionization current signal and a time diagram or the related signals, according to a first embodiment.

An exemplary circuit diagram of a hardware implementation of the block TD Evaluation of the embodiment of the method of evaluation of the combustion chamber pressure of FIG. 11 is shown in FIG. 12, together with relevant time diagrams of the circuit signals.

The voltage signal V(Isense), proportional to the voltage drop on a sense resistance, is filtered by the high pass filter that removes the DC component. Fast transients in the first microseconds following the ignition trigger Tr switching instant are blanked by a switch that remains open for a programmable time interval WT1 generated by a first Delay Generator (interval of time corresponding to a first part of the pre-ignition phase where a first moderate downward (negative) step of the ionization current signal is observed.

When the filtered signal V(Isense) swings down reaching its first negative peak (the symbolically indicated DC reference of comparison may be of the order of about −1V to −2V) of the oscillatory part of the ionization current, coinciding with the ignition instant of the compressed gaseous mixture, a second Delay Generator generates a second programmable time interval in form of the pulse signal WT2 that controls the switches of the block "Peak and Hold". The latter block outputs a voltage signal V(Intg_is) at which charges an integrating capacitor during the programmed time interval WT2. Once the time interval WT2 is elapsed, the system stores on the capacitor the last value assumed by V(Intg_Is) that is proportional to the asymptotic value of the current Is. Thus, the stored value of V(Intg_Is) of an n−1 cycle remains available for the successive $n^{th}$ ignition cycle. Practically, the generated comparison value, assumed at the end of the time interval WT2 of a cycle V(Intg_Is)$_{n-1}$ is proportional to the asymptotic value of the ionization current and remains stored in the capacitor for the successive cycle, becoming the comparison value of V(Isense)$_n$. Eventually, the digital signal Td-ioniz, during a $n^{th}$ cycle will assume a logic state "1" for V(Isense)$_n$=V(Intg_Is)$_{n-1}$ and reset the counter that had been activated by the trigger signal Tr.

Therefore, the pulse count appearing on the Pulse Counter before reset, will be proportional to the duration of TD, from the trigger signal instant Tr to V(Isense)''=V(Intg_Is)$_{n-1}$. Scaling factor and resolution of TD will depend from the circuit clock frequency value. The time diagrams resume the TD evaluation circuitry behavior wherein gross signal disturbances of V(Isense) are blanked-out during a blanking WT1 delay time, before the signal is fed to the voltage comparator. The Peak-and-Hold block assures availability of V(Intg_Is)$_{n-1}$ at the comparator input before acquiring the new V(Intg_Is)$_n$ value to be used for next cycle, through the analog time averaging process of V(Isense) during the WT2 time window. WT2 starts as soon as the filtered V(Isense) signal falls below a constant negative voltage VDC, usually set in the range $-1 \div -2V$ for Rsense=50Ω.

The mixed analog/digital exemplary embodiment of FIG. 12 is depicted as a possible example of hardware implementation, although the algorithm may obviously be alternatively implemented in different circuital forms and with alternative analog and/or digital circuits.

Figure 13:
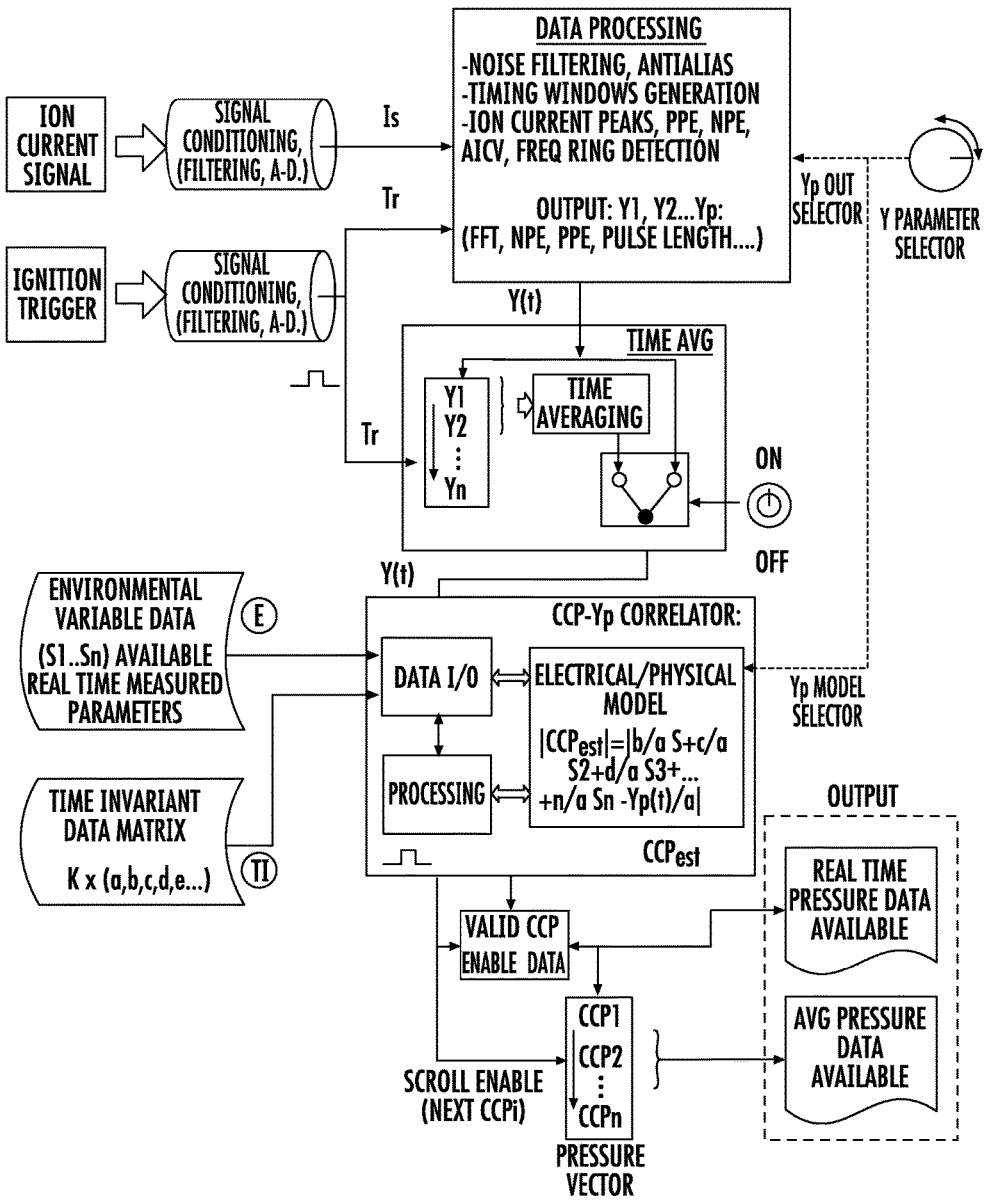
FIG. 13 illustrates an embodiment of ionization current data acquisition, calculation of features of the monitored current waveform and real time data processing for producing estimated instantaneous and averaged values of charge pressure value, according to an embodiment.

An alternative system of real time combustion chamber pressure evaluation, according to a different embodiment of the method of this disclosure, based on the correlation between CCP and one or more real time calculated features of the oscillatory part of the waveform of the sensed ionization current waveform, is illustrated in FIG. 13.

According to this embodiment, the on-board system, instead of employing the TD Evaluation block of the embodiment described with reference to FIGS. 11 and 12, uses a Data Processing Block for calculating in real time at least one of a plurality of feature values of the oscillatory decay part of the ionization current waveform, namely: the first harmonics value of the Fast Fourier Transform, substantially proportional to the peak amplitude of the $1^{st}$ ringing frequency cycle (briefly FFT), the negative and positive peak envelopes (briefly, NPE and PPE) and pulse length. Calculations are performed on digital sample values of the monitored ionization current within a programmable time window WT3 of waveform data acquisition, starting from the ignition instant and lasting for a programmable time.

According to this embodiment, the calculated feature value Y(t) selected among the many calculated (FFT, NPE, PPE, Pulse length) by setting a Parameter Selector, eventually averaged in the block Time AVG over a number of engine cycles, is fed together with the current set of Environmental Variable Data and the Time Invariant Data Matrix to the block CCP-TD Correlator embedding the same Electrical/Physical Model of the electrical and physical spark plug ignition system and combustion chamber of the engine used in the calibration campaign of tests for generating and making available on respective outputs, instantaneous and averaged values of real time estimated CCP pressure.

Figure 14:
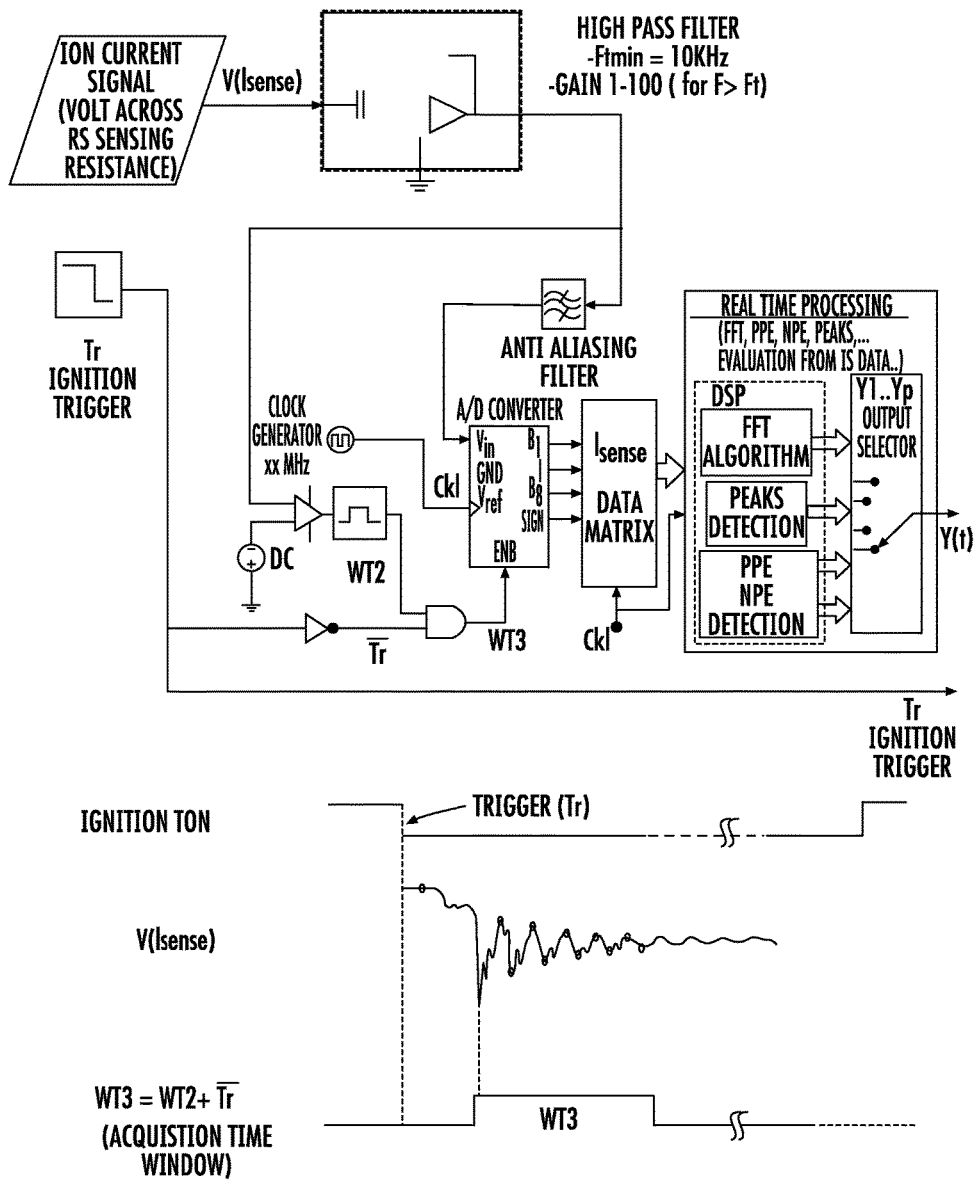
FIG. 14 illustrates a circuit diagram for setting the duration of a sample data acquisition window of the monitored ionization current signal and a time diagram or the related signals, adapted for the embodiment of FIG. 13.

An exemplary circuit diagram of a hardware implementation of the block Data Processing of the embodiment of the method of evaluation of the combustion chamber pressure of FIG. 13, together with relevant time diagrams of the circuit signals is depicted in FIG. 14.

As depicted in the timing diagrams of FIG. 12, the time window of ionization current values acquisition starts from the instant at which the ionization current waveform swings down towards its maximum negative peak value, determined by the comparison of the filtered signal V(Isense) with the symbolically indicated DC reference that may be of the order of about $-1V$ to $-2V$) and its duration may WT3.

A given number M of ionization current sample digital data output by the A/D Converter thus obtained (e.g. 10-20 bits per sample) form a characteristic vector of the discharge current in the chosen interval of time. In order to untie from cycle-to-cycle variability of the spark discharge and disturbances inevitably present in such an electrically highly noisy environment, the ionization current data acquisition in a fixed time window is repeated for N successive engine cycles. Therefore, digitized information is temporarily stored in a Isense Data Matrix that will have a M×N size.

In the processing DSP unit, dedicated calculation structures, such as the depicted FTT algorithm; Peak detection, PPE, NPE detection, output the peak amplitude of the $1^{st}$ ringing frequency (first harmonic) peak in the Fast Fourier Transform domain, the negative and positive peak envelope functions PPE and NPE, respectively, and the selected waveform feature data Y(t) are finally fed to the CCP-Y(t) Correlator block of FIG. 13.

Preferably, the real time data acquisition system of this disclosure is made to operate over innumerable engine cycles. For a new set of values relative to the new $n+1^{th}$ cycle to be stored, the cycle n−(n−1) out of the n vectors contained in the Isense Data Matrix will be replaced by the n−(n−2) one, for example through a simple "back Shift" of the stored data.

The method and embodiments of the on board combustion chamber pressure estimation system from the monitored ionization current data of this disclosure may contemplate even the possibility of purposely commanding one or more "service" spark plug discharges following ignition, that is during the phase of flame propagation inside the engine cylinder, in order to gather information on CCP at selected instants following the pre-ionization phase and the ignition instant, using substantially the same method and on board system for real-time data processing and pressure evaluation.

Availability of data related to a large number of samples per cycle and for n cycles in succession, continuously updated by a "rolling acquisition process", provides an outstandingly effective instrument for a precise and reliable estimation of instantaneous values of a basic physical parameter of operation of the running engine as well as of time-based averages thereof.

In addition, through a comparative analysis of available sample values, the system may autonomously reduce the read noise by recognizing when a particular set of acquired data is statistically irrelevant, i.e. falling outside a min-max range of data values acquired during calibration process.

The circuital arrangement and means for sensing the ionization current flowing through the spark plug may be different from the mentioned resistive layer connected to the ground electrode of the plug, described in the cited prior patent application of the same applicants. The current may be sensed alternatively on the high voltage secondary coil terminal side, for example by using a transformer, with or without a magnetic core for coupling the high voltage supply cable of the spark plug to a sense resistor referred to ground, or a double resistive voltage divider in a Wheatstone bridge configuration, a Hall sensor and equivalent sensing means.

The various embodiments described above can be combined to provide further embodiments. The embodiments may include structures that are directly coupled and structures that are indirectly coupled via electrical connections through other intervening structures not shown in the figures and not described for simplicity. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

REFERENCES

[1] "*Investigation on characteristics of ionization current in a spark-ignition engine fueled with gas-hydrogen blends with BSS de-noising method*", Zhongquan Gao, et al., International Journal Of Hydrogen Energy-35 (2010), pages: 12918-12929;
[2] "*Method of Ion Current Detection for HCCI Combustion on SI/HCCI Dual Mode Engine*", Guagyu Dong, et al., 978-1-4244-3504, 03/2009 IEEE;
[3] N. A. Henein, W. Bryzik, A. Abdel-Rehim and A. Gupta, "*Characteristics of Ion Current Signals in Compression Ignition and Spark Ignition Engines*" SAE, Warrendale, Pa., Tech. Rep. 2010-01-0567, 2010.
[4] A. A. Martychenko, J. K. Park, Y. S. Ko, A. A. Balin, J. W. Hwang, J. O. Chae, "*A Study on the Possibility of Estimation of In-Cylinder Pressure by Means of Measurement of Spark Gap Breakdown Voltage*", SAE, Warrendale, Pa., Tech. Rep. 1999-01-1115, 1999.
[5] G. A Noble, C. R. Morganti, "Misfire detection in a spark ignition engine", U.S. Pat. No. 5,492,007, 1995.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method of real-time evaluation of at least pressure in a combustion chamber of an electronically controlled spark plug ignition engine by sensing an ionization current flowing through a spark plug, the method comprising:
refining a mathematical model of the electronically controlled spark plug ignition engine and the combustion chamber through a calibration campaign of tests conducted on a test engine equipped with specific sensors of combustion chamber pressure, and a first engine parameter by iteratively testing interactive performance of correlation coefficients of related terms of a mathematical expression of the mathematical model and comparing an estimated pressure value generated by the mathematical model with a pressure value as measured by a sensor;
storing in a matrix or look-up table a set of time invariant correlation coefficients of the terms when a residual mismatch between the estimated pressure value generated by the mathematical model compared with the measured value remains within a maximum spread; and
sensing the ionization current in the electronically controlled spark plug ignition engine when the electronically controlled spark plug ignition engine is running, measuring or calculating at least one or more significant features of a waveform of the sensed ionization current and processing the at least one or more significant features of the waveform together with the matrix or look-up table and with a set of actual values of parameters of the electronically controlled spark plug ignition engine when the electronically controlled spark plug ignition engine is running for producing an evaluated value of the combustion chamber pressure.

2. The method of claim 1, wherein the one or more significant features of the waveform of the sensed ionization current comprise one or more features selected from the group consisting of:
a time delay of a beginning of an oscillatory decay phase of the ionization current from an electronically controlled generation of a trigger signal of a spark plug discharge,
a calculated amplitude of a first ringing frequency peak in a frequency domain,
a calculated asymptotic current value,
a calculated amplitude of resonance peaks or envelope function, and
a time width of current peaks of the oscillatory decay phase of the ionization current.

3. The method of claim 2, wherein the one or more significant features of the waveform of the sensed ionization current comprises a time delay of a beginning of an oscillatory decay phase of the ionization current subsequent to a trigger signal of a spark plug discharge, the method further comprising
defining a length of a data acquisition time interval following the time delay, wherein the measuring or calculating the at least one or more significant features of the waveform of the sensed ionization current comprises measuring the ionization current during the length of the data acquisition time interval.

4. The method of claim 1, further comprising:
processing acquired data of the ionization current over a programmable data acquisition time interval for outputting instantaneous values of the at least one or more significant features of the waveform;
averaging over a given number of engine cycles the measured or calculated at least one or more significant features of the waveform for selectively outputting the instantaneous or the averaged values of the at least one or more significant features of the waveform to produce continuously updated vectors of values of the at least one or more significant features of the waveform for the given number of engine cycles; and
feeding the selected instantaneous or averaged values of the at least one or more significant features of the waveform together with the set of time invariant correlation coefficients of the matrix or look-up table and with the set of actual values of parameters of the electronically controlled spark plug ignition engine when the electronically controlled spark plug ignition engine is running to a correlator embedding the mathematical model of the electronically controlled spark plug ignition engine and combustion chamber for generating on respective outputs correspondingly evaluated instantaneous and averaged values of the combustion chamber pressure.

5. The method of claim 1, wherein one or more spark discharges are commanded after ignition has taken place for gathering multiple estimated instantaneous values of pressure in the combustion chamber over a complete ignition-flame propagation-full combustion-exhaust process.

6. The method of claim 1, wherein the first engine parameter comprises
   ambient temperature; or
   air/fuel ratio or correspondent throttle.

7. The method of claim 2, wherein calculating the amplitude of the first ringing frequency peak comprises calculating a Fast Fourier Transform (FFT) of the sensed ionization current.

8. A method comprising:
   refining a mathematical model of a spark plug ignition system, the mathematical model comprising a set of time-invariant coefficients, wherein refining the mathematical model comprises:
      monitoring an ionization current of a test engine,
      monitoring a pressure of a combustion chamber of the test engine by measuring a pressure sensor,
      generating the set of time-invariant coefficients based on the monitored ionization current of the test engine and the monitored pressure of the combustion chamber of the test engine,
      estimating a pressure of the combustion chamber of the test engine based on the generated set of time-invariant coefficients,
      comparing the estimated pressure of the combustion chamber of the test engine with the measured pressure of the combustion chamber of the test engine,
      regenerating the set of time-invariant coefficients when a residual mismatch between the estimated pressure of the combustion chamber of the test engine and the measured pressure of the combustion chamber of the test engine is higher than a predetermined threshold, and
      storing the set of time-invariant coefficients when the residual mismatch between the estimated pressure of the combustion chamber of the test engine and the measured pressure of the combustion chamber of the test engine is lower than the predetermined threshold; and
   applying the mathematical model to a running engine to obtain real-time estimated values of pressure of a combustion chamber of the running engine, wherein the applying the mathematical model comprises
      monitoring an ionization current of the running engine, and
      estimating a pressure of the combustion chamber of the running engine based on the monitored ionization current of the running engine and the mathematical model.

9. The method of claim 8, wherein
   monitoring the ionization current of the running engine comprises determining a time delay between an ignition trigger signal and a beginning of an oscillatory decay phase of the monitored ionization current of the running engine; and
   the estimating the pressure of the combustion chamber of the running engine is further based on the determined time delay.

10. The method of claim 9, wherein monitoring the ionization current of the running engine further comprises blanking a data-acquisition process during the time delay.

11. The method of claim 8, wherein
   monitoring the ionization current of the running engine comprises determining an amplitude of a first harmonic peak of a decaying oscillatory phase of the ionization current of the running engine; and
   the estimating the pressure of the combustion chamber of the running engine is further based on the amplitude of the first harmonic peak.

12. The method of claim 11, wherein the determining the amplitude of the first harmonic peak comprises calculating a Fast Fourier Transform (FFT) of the monitored ionization current of the running engine.

13. The method of claim 12, wherein monitoring the ionization current of the running engine further comprises determining an envelope function of the decaying oscillatory phase of the ionization current of the running engine by extracting from the calculated FFT amplitudes of at least a second harmonic peak of the decaying oscillatory phase of the ionization current of the running engine.

14. The method of claim 8, wherein monitoring the ionization current of the running engine comprises:
   sensing a voltage across a resistor in series with a spark plug; and
   filtering the sensed voltage with an analog filter.

15. The method of claim 14, wherein monitoring the ionization current of the running engine further comprises converting the filtered voltage into digital-sampled data with an analog-to-digital converter (ADC), wherein the ADC begins sampling data a period of time after an ignition trigger signal.

16. The method of claim 8, wherein
   the refining the mathematical model further comprises monitoring a temperature of a combustion chamber of the test engine by measuring a temperature sensor;
   the generating the set of time-invariant coefficients is further based on the monitored temperature of the combustion chamber of the test engine; and
   the estimating the pressure of the combustion chamber of the running engine is further based on a monitored temperature of the combustion chamber of the running engine.

17. A spark plug ignition system comprising:
   an ignition coil;
   a spark plug coupled in series with the ignition coil;
   a sense resistor coupled in series with the spark plug;
   a sensing circuit coupled to the sense resistor;
   a combustion chamber comprising a first sensor; and
   a controller configured to:
      monitor an ionization current via the sensing circuit,
      estimate a pressure of the combustion chamber based on the monitored ionization current, a first sensor, and a mathematical model, the mathematical model comprising a set of time-invariant coefficients.

18. The system of claim 17, wherein the first sensor comprises a temperature sensor.

19. The system of claim 17, wherein the controller is further configured to determine a time delay between an ignition trigger signal and a beginning of an oscillatory decay phase of the monitored ionization current, and wherein the estimating the pressure of the combustion chamber is further based on the determined time delay.

20. The system of claim 17, wherein the controller is further configured to determine an amplitude of a first harmonic peak of a decaying oscillatory phase of the ionization current, and wherein the estimating the pressure of the combustion chamber is further based on the amplitude of the first harmonic peak.

21. The system of claim 17, wherein the mathematical model comprises a model refined by:
   monitoring an ionization current of a test engine, monitoring a pressure of a combustion chamber of the test engine by measuring a pressure sensor, generating the set of time-invariant coefficients based on the monitored ionization current of the test engine and the monitored pressure of the combustion chamber of the test engine, estimating a pressure of the combustion chamber of the test engine based on the generated set of time-invariant coefficients, comparing the estimated pressure of the combustion chamber of the test engine with the measured pressure of the combustion chamber of the test engine, regenerating the set of time-invariant coefficients when a residual mismatch between the estimated pressure of the combustion chamber of the test engine and the measured pressure of the combustion chamber of the test engine is higher than a predetermined threshold, and storing the set of time-invariant coefficients when the residual mismatch between the estimated pressure of the combustion chamber of the test engine and the measured pressure of the combustion chamber of the test engine is lower than the predetermined threshold.

\* \* \* \* \*